United States Patent Office
3,074,989
Patented Jan. 22, 1963

3,074,989
TRIMERIC ISOTHIOCYANO POLYFLUORO-
ALKOXY PHOSPHORUS NITRILES
Rudi F. W. Rätz, Hamden, Conn., assignor to Olin Mathieson Chemical Corporation, a corporation of Virginia
No Drawing. Filed July 11, 1961, Ser. No. 123,089
2 Claims. (Cl. 260—454)

This invention relates to trimeric isothiocyano polyfluoroalkoxy phosphorus nitriles and to their preparation.

It has now been found that trimeric isothiocyano polyfluoroalkoxy phosphorus nitriles can be prepared by reaction of an alkali metal thiocyanate with a trimeric halo polyfluoroalkoxy phosphorus nitrile. The novel compounds of this invention are sufficiently thermally stable that they can be subjected to vacuum distillation for purification purposes, if desired.

Trimeric halo polyfluoroalkoxy phosphorus nitriles useful as starting materials have the formula:

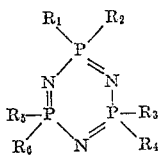

wherein $R_1$, $R_2$, $R_3$, $R_4$, $R_5$ and $R_6$ are selected from the group consisting of chlorine, bromine, fluorine, or $-OCH_2(CF_2)_mY$, wherein Y is selected from the group consisting of hydrogen or fluorine, $m$ is an integer of from 1 to 20, wherein in the said nitrile at least one of the $R_1$, $R_2$, $R_3$, $R_4$, $R_5$ and $R_6$ substituents is $-OCH_2(CF_2)_mY$ and at least one of the $R_1$, $R_2$, $R_3$, $R_4$, $R_5$ and $R_6$ substituents is chlorine, bromine or fluorine. Suitable halo polyfluoroalkoxy phosphorus nitriles for the novel reaction of this invention include trimeric 1-chloro-1,3,3,5,5-pentakis-alpha, alpha-H,H-trifluoroethoxy phosphorus nitrile, trimeric 1,3,5-trichloro-1,3,5-tris-alpha, alpha-H,H-trifluoroethoxy phosphorus nitrile, trimeric 1,3-dichloro-1,3,5,5-tetrakis - alpha, alpha - H,H - pentafluoropropoxy phosphorus nitrile, 1,1,3,3-tetrachloro-5,5-bis-alpha, alpha, omega-H,H,H-hexafluorobutoxy phosphorus nitrile, 1-chloro-1,3,3,5,5-pentakis-alpha, alpha, omega-H,H,H-decafluoroheptoxy phosphorus nitrile, 1,1-dichloro-3,3,5,5-tetrakis-alpha, alpha, omega-H,H,H-eicosafluoroundecanoxy phosphorus nitrile, etc. and the corresponding bromine and fluorine derivatives. The above-mentioned compounds can be conveniently prepared by the general method described in Rätz et al. United States Patent 2,876,247. For example, trimeric 1,3-dichloro-1,3,5,5-tetrakis-alpha, alpha-H,H-heptafluorobutoxy phosphorus nitrile can be prepared by reacting 1 mole of trimeric phosphonitrilic chloride with 4 moles of the sodium salt of 1,1-H,H-heptafluorobutanol in toluene at a temperature of about 100° C.

The reaction proceeds as set forth in the following equation in which, by way of illustration, the reaction between trimeric 1,3,3-trichloro-1,5,5-tris-alpha, alpha-H,H-heptafluorobutoxy phosphorus nitrile with sodium thiocyanate is shown:

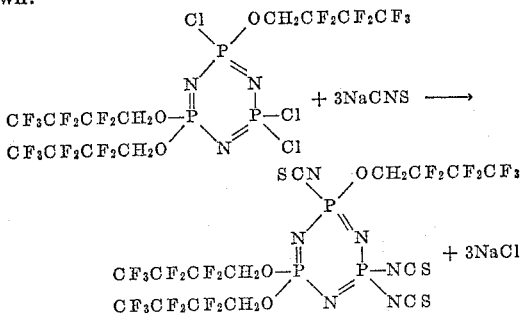

The novel trimeric isothiocyano polyfluoroalkoxy phosphorus nitriles are prepared in good yields by admixing the trimeric halo polyfluoroalkoxy phosphorus nitrile with the alkali metal thiocyanate. In carrying out the reaction approximately theoretical quantities of the starting reactants are employed as set forth in the preceding equation although, if desired, an excess of alkali metal thiocyanate can be employed to insure completion of the reaction. Preferably the reaction is carried out in the presence of a common solvent for both of the reactants which can be acetone, acetonitrile etc. The reaction proceeds in general at temperatures between about $-20°$ C. and about $+80°$ C. When a solvent is employed, the reaction is preferably conducted at the reflux temperature of the solvent. The reaction time will vary from about 2 minutes to about 1 hour or more depending upon the reaction temperature, the particular solvent employed and the particular reactants utilized. The alkali metal halide formed during the reaction is generally insoluble in the applied solvent. The salt can be removed by filtration or by washing with water.

The new trimeric isothiocyano polyfluoroalkoxy phosphorus nitriles are useful in the field of resins and plastics. When heated with bifunctional aliphatic amines of the general formula $NH_2(CH_2)_nNH_2$ where $n$ is an integer of from 2 to 8 inclusive solid polymeric materials with the retained $-P=N-$ ring structure are obtained. Suitable bifunctional aliphatic amines include ethylene diamine, 1,3-diaminopropane, 1,4-diaminopropane, 1,6-diaminohexane, etc. The powdery, polymeric materials obtained by the reaction of the trimeric isothiocyano polyfluoroalkoxy phosphorus nitriles with bifunctional aliphatic amines can be further subjected to a thermal treatment yielding glass-like, polymeric materials which are non-inflammable and practically non-combustible. These glass-like, polymeric materials can be utilized as protective coatings for metals. Such coated metal products can be formed by dipping the metal article into the molten polymer.

EXAMPLE I

*Trimeric 1,1-Bis-Isothiocyano-3,3,5,5-Tetrakis-Alpha, Alpha-H,H-Heptafluorobutoxy Phosphorus Nitrile*

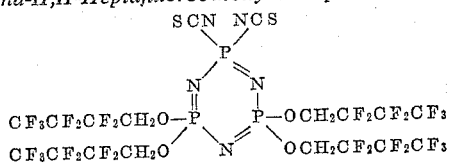

To 8.062 grams of trimeric 1,1-dichloro-3,3,5,5-tetrakis-alpha, alpha-H,H-heptafluorobutoxy phosphorus nitrile (0.0082 mole) dissolved in 15 ml. of dry acetone there was added in one portion a solution of 1.72 grams of potassium thiocyanate (0.165 mole) in 35 ml. of the same solvent. The resulting reaction mixture was then refluxed for 10 minutes. On standing overnight the theoretical amount of potassium chloride (1.2 grams), which had precipitated from the reaction mixture, was removed by filtration. From the clear filtrate the solvent was then recovered by distillation and a yellowish, oily residue admixed with some excess potassium thiocyanate remained. Separation of the oil from the solid was effected by the addition of 25 ml. of ether followed by filtration. After removal of the ether in vacuo, the remaining oil was purified by vacuum distillation yielding 6.9 grams (82 percent of the theoretical yield) of trimeric 1,1-bis-isothiocyano-3,3,5,5-tetrakis-alpha, alpha-H,H - heptafluorobutoxy phosphorus nitrile; B.P. 149/151° C. (0.9 mm.), $n_D^{21}$: 1.3847. The purified product so obtained was a slightly yellowish, clear oil.

The product was analyzed for carbon, hydrogen, nitrogen, phosphorus, and sulphur and the following results were obtained:

|  | C | H | N | P | S |
|---|---|---|---|---|---|
| Calcd. for $C_{18}H_8F_{28}N_6P_3S_2O_4$ | 20.61 | 0.77 | 7.70 | 8.90 | 6.12 |
| Found | 21.94 | 0.84 | 7.09 | 9.08 | 5.79 |

EXAMPLE II

An amount of 4.31 grams of trimeric 1,1-bis-isothiocyano-3,3,5,5-tetrakis-alpha, alpha-H,H-heptafluorobutoxy phosphorus nitrile (0.00412 mole) was mixed with 0.248 gram of ethylenediamine (98 percent, 0.00412 mole). An exothermic reaction was observed with solidification of the mixture. The slightly yellowish material so obtained was extracted with 50 ml. of hexane and finally with the same amount of dry ether. The crude, polymeric, powdery material thus obtained melted between 122° and 124° C.

A sample of the polymeric material obtained in the preceding paragraph was subjected to extended heating at 170° C. in a nitrogen atmosphere. After 3 hours no further weight-loss was observed and a glass-like polymeric material, which was non-inflammable and practically non-combustible, was obtained.

What is claimed is:

1. Trimeric isothiocyano polyfluoroalkoxy phosphorus nitriles of the formula:

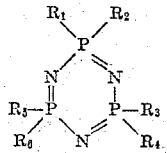

wherein $R_1$, $R_2$, $R_3$, $R_4$, $R_5$, and $R_6$ are selected from the group consisting of —NCS and —$OCH_2(CF_2)_mY$, wherein Y is selected from the group consisting of hydrogen and fluorine, $m$ is an integer of from 1 to 20, wherein at least one of the $R_1$, $R_2$, $R_3$, $R_4$, $R_5$, and $R_6$ substituents is—NCS, and wherein at least one of the $R_1$, $R_2$, $R_3$, $R_4$, $R_5$, and $R_6$ substituents is —$OCH_2(CF_2)_mY$.

2. Trimeric 1,1 - bis-isothiocyano-3,3,5,5-tetrakis-alpha, alpha-H,H-heptafluorobutoxy phosphorus nitrile.

No references cited.